(12) United States Patent
Klok et al.

(10) Patent No.: US 10,543,458 B2
(45) Date of Patent: Jan. 28, 2020

(54) PROCESS FOR TREATING A HYDROGEN SULPHIDE AND MERCAPTANS COMPRISING GAS

(71) Applicant: PAQELL B.V., Amsterdam (NL)

(72) Inventors: Johannes Bernardus Maria Klok, Amsterdam (NL); Gijsbert Jan van Heeringen, Amsterdam (NL); Jan Henk van Dijk, Amsterdam (NL); Albert Joseph Hendrik Janssen, Geldermalsen (NL)

(73) Assignee: PAQELL B.V., Amsterdam (NL)

( * ) Notice: Subject to any disclaimer, the term of this patent is extended or adjusted under 35 U.S.C. 154(b) by 250 days.

(21) Appl. No.: 15/551,648

(22) PCT Filed: Feb. 18, 2016

(86) PCT No.: PCT/EP2016/053480
§ 371 (c)(1),
(2) Date: Aug. 17, 2017

(87) PCT Pub. No.: WO2016/131930
PCT Pub. Date: Aug. 25, 2016

(65) Prior Publication Data
US 2018/0043304 A1    Feb. 15, 2018

(30) Foreign Application Priority Data
Feb. 19, 2015    (EP) ..................................... 15155753

(51) Int. Cl.
*B01D 53/84*    (2006.01)
*B01D 53/52*    (2006.01)
(Continued)

(52) U.S. Cl.
CPC ............. *B01D 53/84* (2013.01); *B01D 53/52* (2013.01); *B01D 53/96* (2013.01); *C02F 3/2806* (2013.01);
(Continued)

(58) Field of Classification Search
CPC ........ B01D 53/84; B01D 53/52; B01D 53/96; B01D 53/48; B01D 2258/05;
(Continued)

(56) References Cited

U.S. PATENT DOCUMENTS

| 5,976,868 A | 11/1999 | Buisman |
| 6,217,766 B1 | 4/2001 | Stetter |

(Continued)

FOREIGN PATENT DOCUMENTS

| EP | 1270704 A1 | 1/2003 |
| WO | 1992/010270 A1 | 6/1992 |

OTHER PUBLICATIONS

Sipma et al., Development of a novel process for the biological conversion of H2S and methanethiol to elemental sulfur, Biotehcnol Bioeng 82(1) 1-11 (2003).

*Primary Examiner* — Liban M Hassan
(74) *Attorney, Agent, or Firm* — Nixon Peabody LLP; Ronald I. Eisenstein; Nicole D. King

(57) ABSTRACT

A process to treat a gas comprising hydrogen sulphide and mercaptans is described. The following steps are part of this process: (a) contacting the hydrogen sulphide and mercaptans comprising gas (1) with an aqueous solution (3) comprising sulphide-oxidising bacteria thereby obtaining a loaded aqueous solution (5) and a gas (4) having a lower content of hydrogen sulphide and mercaptans, (b) contacting the loaded aqueous solution with mercaptan reducing microorganisms immobilized on a carrier under anaerobic conditions, (c) separating the aqueous solution obtained in step (b)

(Continued)

from the mercaptan reducing microorganisms to obtain a first liquid effluent (7), and (d) contacting the first liquid effluent (7) with an oxidant (9) to regenerate the sulphide-oxidising bacteria to obtain a second liquid effluent (11) comprising regenerated sulphide-oxidising bacteria. The sulphide-oxidising bacteria as present in step (a) are comprised of regenerated sulphide-oxidising bacteria obtained in step (d).

16 Claims, 2 Drawing Sheets

(51) Int. Cl.
*C02F 3/30* (2006.01)
*C02F 3/28* (2006.01)
*C02F 3/34* (2006.01)
*B01D 53/96* (2006.01)
*C02F 101/10* (2006.01)
*C02F 103/18* (2006.01)

(52) U.S. Cl.
CPC ............ *C02F 3/2846* (2013.01); *C02F 3/301* (2013.01); *C02F 3/345* (2013.01); *B01D 2251/95* (2013.01); *B01D 2257/304* (2013.01); *B01D 2257/306* (2013.01); *C02F 2101/101* (2013.01); *C02F 2103/18* (2013.01)

(58) Field of Classification Search
CPC ........ B01D 2257/306; B01D 2257/304; B01D 2256/245; B01D 2251/95; C02F 3/301; C02F 3/2806; C02F 3/345; C02F 3/2846; C02F 3/30; C02F 2101/101; C02F 2103/18; Y02A 50/2358
USPC ........................................................ 435/266
See application file for complete search history.

(56) References Cited

U.S. PATENT DOCUMENTS

| | | | |
|---|---|---|---|
| 6,224,750 B1 | 5/2001 | Pittman | |
| 7,588,627 B2 * | 9/2009 | Kijlstra | ............. B01D 53/1425 95/187 |
| 2006/0188424 A1 | 8/2006 | Kijlstra | |
| 2008/0190844 A1 | 8/2008 | Haase | |

* cited by examiner

PROCESS FOR TREATING A HYDROGEN SULPHIDE AND MERCAPTANS COMPRISING GAS

CROSS REFERENCE TO RELATED APPLICATIONS

This application is a 371 National Phase Entry of International Patent Application No. PCT/EP2016/053480 filed Feb. 18, 2016 which claims benefit under 35 U.S.C. § 119(e) of European Patent Application No. 15155753.5 filed Feb. 19, 2015, the contents of which are incorporated herein by reference in their entirety.

FIELD OF THE INVENTION

The present invention relates to a process for treating a hydrogen sulphide and mercaptans comprising gas by contacting the hydrogen sulphide and mercaptans comprising gas with an aqueous solution.

BACKGROUND OF THE INVENTION

Processes comprising a sour gas absorption of a hydrogen sulphide comprising gas followed by biological oxidation of the dissolved sulphides are for example disclosed in WO92/10270, WO94/29227, WO98/57731, US2008/0190844 and WO2005/092788. Such processes include the biological conversion of bisulphide into elemental sulphur by means of sulphide-oxidising bacteria in an aerobic bioreactor. Typically in such processes, a liquid alkaline absorbent that has been used for absorption of hydrogen sulphide from a sour gas stream and that comprises absorbed hydrogen sulphide, predominantly in the form of bisulphide but typically also to some extent sulphide, polysulphide and/or dissolved hydrogen sulphide, is contacted with sulphide-oxidising bacteria for conversion of dissolved sulphides (mainly as bisulphide) into elemental sulphur.

Anaerobic degradation of mercaptans like methanethiol is described by Van Leerdam, R. C., 2007. Anaerobic degradation of methanethiol in a process for Liquified Petroleum Gas (LPG) biodesulfurization, PhD-thesis Wageningen University, Wageningen, The Netherlands, ISBN: 978-90-8504-787-2. In chapter 3, pages 79-80 it is mentioned that sulfide compounds inhibit the biological methanethiol degradation.

Biological processes can be very advantageous method of gas desulphurization, especially at low to medium sulphur loads and also in cases where traditional desulphurization is not very effective. It is therefore an object of the present invention to provide a biological process which can simultaneously treat a gas comprising both hydrogen sulphide and mercaptans.

SUMMARY OF THE INVENTION

This aim is achieved by the following process. A process to treat a hydrogen sulphide and mercaptans comprising gas comprising the following steps:

(a) contacting the hydrogen sulphide and mercaptans comprising gas with an aqueous solution comprising sulphide-oxidising bacteria thereby obtaining a loaded aqueous solution comprising bisulphide and mercaptan compounds and sulphide-oxidising bacteria and a gas having a lower content of hydrogen sulphide and mercaptans, (b) contacting the loaded aqueous solution with a mercaptan reducing microorganism under anaerobic conditions wherein bisulphide is converted to elemental sulphur and mercaptans are converted to hydrocarbons and hydrogen sulphide, (c) separating the aqueous solution obtained in step (b) from the mercaptan reducing microorganisms to obtain a first liquid effluent, (d) contacting the first liquid effluent with an oxidant to regenerate the sulphide-oxidising bacteria to obtain a second liquid effluent comprising regenerated sulphide-oxidising bacteria, wherein the sulphide-oxidising bacteria as present in step (a) are comprised of regenerated sulphide-oxidising bacteria obtained in step (d).

Applicants found that the process makes it possible to simultaneously convert mercaptans to sulphides and sulphides to sulphur by means of a biological process. Furthermore gas having higher ratio's of mercaptans to hydrogen sulphide can be treated with this process. Furthermore the selectivity towards elemental sulphur is significantly increased and the formation of the undesired sulphate and thiosulphate is reduced. A further advantage of the process is that the content of bisulphide in the loaded aqueous solution may be higher than in previous processes without generating high amounts of thiosulphate as the by-product.

As mentioned above the biologic formation of sulphate is significantly reduced and the selectivity towards elemental sulphur significantly increased with the process according to the invention. Without wishing to be bound to any theory, it is believed that the exposure of the sulphide-oxidising bacteria to bisulphide in the presence of elemental sulphur under anaerobic conditions in step (b), results in the suppression of enzyme systems in the sulphide-oxidising bacteria that are involved in the conversion of bisulphide into sulphate in favor of enzyme systems involved in the selective oxidation of bisulphide and/or polysulphides into elemental sulphur.

Also the formation of thiosulphate due to chemical oxidation of bisulphide is significantly reduced compared to prior art biological sulphide-oxidising processes as no direct contact occurs between a solution high in bisulphides and molecular oxygen. Such a direct contact between a solution high in bisulphides and molecular oxygen does take place in the aforementioned prior art processes.

A further advantage of the process according to the invention is that due to the lower formation of undesired oxidation products such as sulphate and thiosulphate and the conversion of mercaptans, the bleed stream that needs to be purged from the process to avoid a too large built-up of undesired compounds can be reduced and therewith a larger amount of sulphide-oxidising bacteria is maintained in the process and less make-up chemicals, like the optional alkalines, need to be added to the process.

DETAILED DESCRIPTION OF THE INVENTION

Figure 1:
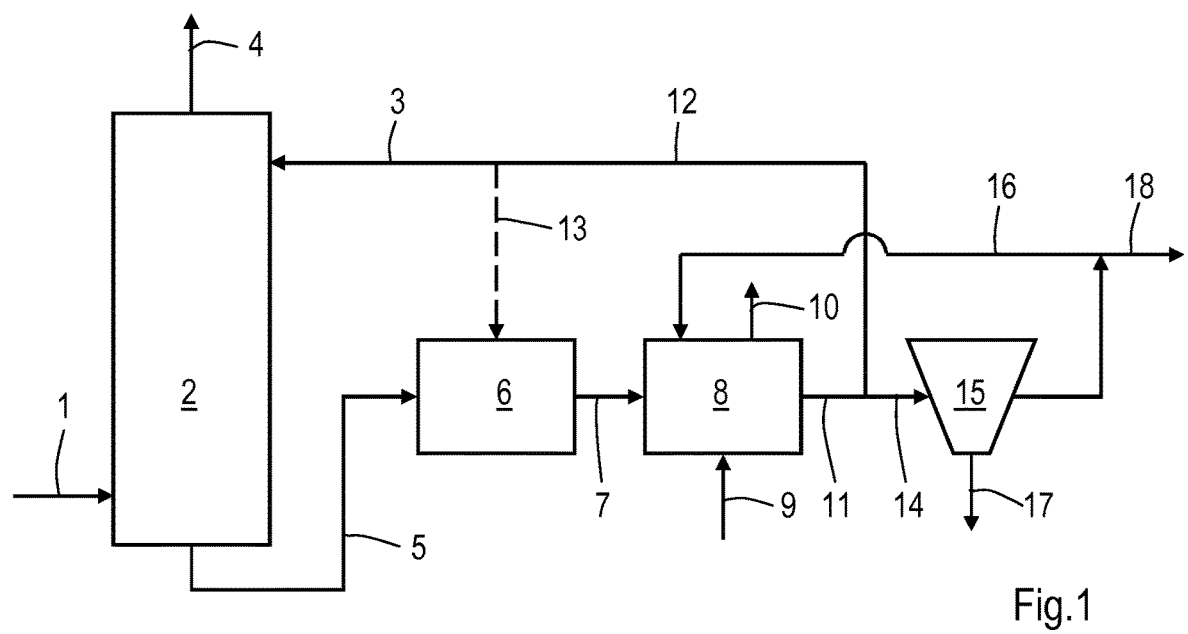
FIG. 1 shows a process line-up of an embodiment of the invention with an absorption step and first and second bioreactors.

Without wishing to be bound to any theory, it is believed that in step (b) bisulphide reacts with elemental sulphur to form polysulphide, and that bisulphide and/or polysulphide are at least partly biologically oxidised into elemental sulphur whilst electron acceptors in the sulphide-oxidising bacteria take up the electrons that result from the oxidation reaction until such acceptors are completely reduced, resulting in so-called reduced state bacteria. In step (d) the bacteria are regenerated, i.e. they are brought from a reduced state into an oxidised state. It is believed that in this stage the electron acceptors donate electrons to the oxidant and are therewith regenerated so that they can thereafter oxidise bisulphide and/or polysulphide in the absence of molecular oxygen again.

Applicants believe that by treating the sulphide oxidising bacteria under the anaerobic and aerobic conditions of the process according to the invention conditions are created which favor the existence of a sub-population of bacteria which have a low selectivity to sulphate and a high selectivity to elemental sulphur starting from bisulphide. In additions by treating the mercaptans reducing microorganisms under anaerobic conditions a sub-population of microorganisms is favored which have a high selectivity for mercaptans reduction.

The process may be performed as a continuous process, a batch process or as a semi-batch process. Preferably the process as here described is performed as a continuous process.

The hydrogen sulphide and mercaptans comprising gas may be any gas comprising such compounds. A gas comprising of substantially only hydrogen sulphide and mercaptans may be used. The hydrogen sulphide and mercaptans may also be in admixture with other gaseous hydrocarbons, such as for example methane, ethane, propane and/or higher boiling hydrocarbons. The process is also suited to process a gas which in addition also comprises carbon dioxide. Such a gas may be natural gas, bio-gas, refinery off gas, synthesis gas, geothermal gas, landfill gas or acid gas obtained in an amine gas treating process.

The mercaptans compounds may be any mercaptans or also referred to as thiol. This organosulphur compounds contains a carbon-bonded sulfhydryl (—C—SH or R—SH) group, wherein R may for example be an alkane, alkene or aryl, suitably alkane having from 1 to 4 carbon atoms. Suitably the mercaptans is methanethiol optionally in admixture with ethanethiol and/or propanethiol. Mercaptans having higher carbon numbers may also be present in such a mixture.

The combined concentration of hydrogen sulphide and mercaptans in the gas may range from trace amounts to 100 vol %. The volume ratio of mercaptans and hydrogen sulphide in the gas may range from 1:100000 to 1:10. The concentration of carbon dioxide may be between 0 and 90 vol. %. The gas stream may further comprise other sulphur compounds, for example carbonyl sulphide.

The gas may have a combined concentration of hydrogen sulphide and mercaptans of more than 80 vol %, preferably more than 90 vol % and even more preferably for more than 99 vol % of $H_2S$ and mercaptans. For such a gas it may be advantageous to perform step (a) and (b) simultaneously. This may be achieved by providing the gas to a bio reactor in which the mercaptan reducing microorganisms are present and to which reactor also an aqueous solutions is provided comprising the regenerated sulphide-oxidising bacteria. Such a gas stream should not contain any significant amounts of molecular oxygen in order to maintain the anaerobic conditions of step (b).

In step (a) the hydrogen sulphide and mercaptans comprising gas is contacted with an aqueous solution comprising the sulphide-oxidising bacteria. In this step (a) a loaded aqueous solution comprising a bisulphide, mercaptans and sulphide-oxidising bacteria is obtained. Further a treated gas having a lower content of hydrogen sulphide and mercaptans is obtained. Such a process is also referred to as an absorption process and is typically performed in an absorption or contacting column where gas and liquid flow counter-currently. Thus such a column is provided with an inlet for a gas feed and an outlet for loaded aqueous solution at its lower end and an outlet for treated gas and an inlet for the aqueous solution comprising sulphide-oxidising bacteria at its upper end. In order to enhance the absorption of hydrogen sulphide and mercaptans by the aqueous solution it is preferred that the aqueous solution is a buffered solution comprising an alkaline salt.

The buffered solution may be any liquid alkaline absorbent known to be suitable for absorption of hydrogen sulphide. Examples of suitable liquid alkaline absorbents are carbonate, bicarbonate and/or phosphate solutions and more preferably the aqueous solution is a buffered solution further comprising sodium carbonate and sodium bicarbonate or potassium carbonate and potassium bicarbonate or their mixtures. The pH of the liquid alkaline absorbent as supplied to the absorption column, is preferably in the range of from 7 to 10, more preferably of from 7.5 to 9.5. It will be appreciated that in downward direction of the column, the pH of the absorption liquid will decrease due to absorption of acidic compounds from the gas stream, in particular hydrogen sulphide and optionally carbon dioxide. The pH of the loaded aqueous solution obtained in step (a) will be typically lower than the pH of the aqueous solution provided to the absorption column. The pH of the loaded aqueous solution obtained in step (a) may be as low as 6.5 and is preferably in the range of from 6.5 to 9.0.

Process conditions for step (a) are well-known in the art and generally include a temperature in the range of from 0° C. to 100° C., preferably of from 20° C. to 80° C., more preferably of from 25° C. to 40° C. and a pressure in the range of from 0 bara to 100 bara, preferably of from atmospheric pressure to 80 bara. Step (a) is suitably performed under anaerobic conditions. The gas to be treated therefore preferably does not contain oxygen in any significant amount.

Applicants found that the removal of dissolved bisulphide from the aqueous solution by biological remediation by the sulphide-oxidising bacteria may even occur during step (a), especially when step (a) is performed under anaerobic conditions. This in turn results in a more efficient absorption of hydrogen sulphide. Advantageously, size and volume of the absorption column and the amount of alkaline absorbent needed can be reduced. This is especially advantageous when the gas to be treated also comprises carbon dioxide. By being able to reduce the contact time in the absorption column less carbon dioxide absorption takes place and undesired decrease of pH of the liquid alkaline absorbent is avoided.

The loaded aqueous solution as obtained in step (a) comprises dissolved bisulphide and optionally sulphur converted to elemental sulphur by the sulphide-oxidising bacteria in step (a). The combined concentration of bisulphide and the optional elemental sulphur in the loaded aqueous solution obtained in step (a) (expressed as sulphur) may be up to 20 grams per litre. Preferably this combined concentration in the loaded aqueous solution is in the range of from 100 mg/L to 15 g/L, more preferably of from 150 mg/L to 10 g/L. The loaded aqueous solution as obtained in step (a) may have a very high concentration of mercaptans ranging to at most 5 g/L, more suitably at most 2 g/L and suitably at most 0.2 g/L.

In step (b) the loaded aqueous solution already comprising sulphide-oxidising bacteria is contacted with mercaptan reducing microorganisms under anaerobic conditions. In this step (b) bisulphide is converted to elemental sulphur by the sulphide-oxidising bacteria and mercaptans are reduced to hydrocarbons and hydrogen sulphide by the mercaptan reducing microorganism. For example, in case of methanethiol the reduction is to methane and hydrogen sulphide. The hydrogen sulphide as formed will be present in the aqueous solution as bisulphide and will in turn be converted in step (b) to elemental sulphur by the sulphide-oxidising bacteria.

The biological conversions of bisulphide into elemental sulphur is performed by the regenerated sulphide-oxidizing bacteria as obtained in step (d) under anaerobic conditions. Anaerobic conditions are suitably achieved by performing step (b) in the absence of molecular oxygen, preferably also in the absence of other oxidants such as for example nitrate. By 'in the absence of molecular oxygen' is meant that the concentration of molecular oxygen in the aqueous reaction medium of step (b) is at most 10 μM molecular oxygen, preferably at most 1 μM, more preferably at most 0.1 μM molecular oxygen.

The sulphide-oxidising bacteria may be any sulphide-oxidising bacteria, preferably sulphide-oxidising bacteria of the genera *Halothiobacillus, Thioalkalimicrobium, Thioalkalispira, Thioalkalibacter, Thioalkalivibrio, Alkalilimnicola, Alkalispirillum* and related bacteria. The bacteria may be used as such, or may be supported on a dispersed carrier. Suitably these bacteria are present in the aqueous solution that they are easily separated from the mercaptan reducing microorganisms in step (c).

The mercaptans reducing microorganism may suitably be any microorganism which under the anaerobic conditions of step (b) can reduce mercaptans. The organism is suitably a methanogen. These microorganism are advantageous because they are active under the anaerobic conditions of step (b). The population of these microorganisms which are capable of reducing mercaptans will grow because of the availability of mercaptans in the loaded aqueous solution.

The conversions in step (b) may take place at any suitable conditions of temperature, pressure and hydraulic residence time for biological oxidation of bisulphide into elemental sulphur and biological reduction of mercaptans. Preferably the temperature is in the range of from 10 to 60° C., more preferably of from 20 to 40° C. The pressure is preferably in the range of from 0 bara to 100 bara, more preferably of from atmospheric pressure to 80 bara.

Preferably the pH of the aqueous solution in step (b) is in the range of from 7 to 10, more preferably in the range of from 7.5 to 9.5. The aqueous solution may comprise trace compounds, such as for example iron, copper or zinc, as nutrients for the sulphide-oxidising bacteria and/or mercaptan reducing microorganisms.

In step (b) additional electron-donors, like for example hydrogen, may be added to enhance the reduction of the mercaptans by the mercaptan reducing microorganisms.

The residence time of the sulphide-oxidising bacteria in step (b) is preferably at least 3 minutes, more preferably at least 5 minutes, more preferably at least 10 minutes. The maximum residence time is not critical, but for practical reasons, the residence time is preferably at most 2 hours, more preferably at most 1 hour.

In step (a) and (b) suitably more than 80 mol %, preferably more than 90 mol % and even more preferably more than 95 mol % of the dissolved bisulphide is removed from the aqueous solution by biological remediation by the sulphide-oxidising bacteria in steps (a) and (b). In step (a) part of the dissolved bisulphide will already be removed by the regenerated sulphide-oxidising bacteria as present in the aqueous solution. The percentages of removal is based on the total bisulphide as absorbed in step (a). The actual conversion to elemental sulphur which takes place within the bacteria may take place in step (a), in step (b), in step (c) or in the transport between these steps. Preferably, the conversion of bisulphide is such that the first liquid effluent as supplied to step (d) comprises less than 10 mM, more preferably less than 5 mM and even more preferably less than 1 mM dissolved bisulphide. Even more preferably the first liquid effluent is essentially free of dissolved bisulphide. Preferably the bulk concentration of dissolved bisulphide in step (b) is also less than 10 mM, more preferably less than 5 mM and even more preferably less than 1 mM and most preferably essentially free. The low bisulphide concentration in step (b) is advantageous to allow the mercaptan reducing microorganisms to perform optimally. It is further believed that the low bisulphide content avoids the growth of the bacteria population which seem to be responsible for the formation of sulphate in either step (b) or (d) and avoids the chemical oxidation to thiosulphate.

Elemental sulphur is formed by selective oxidation of bisulphide, possibly via polysulphide as intermediate product, to elemental sulphur. The first liquid effluent obtained in step (c) will comprise elemental sulphur and sulphide-oxidising bacteria. This first liquid effluent may be directly supplied to step (d) for regeneration of the sulphide-oxidising bacteria, i.e. to bring the bacteria in an oxidised state. By directly supplied is here meant that no intermediate process step is performed with the object to remove elemental sulphur and/or sulphide-oxidising bacteria from the first liquid effluent. Optionally elemental sulphur may be removed from the first liquid effluent. In such a step some of the sulphide-oxidising bacteria may also be removed from the first liquid effluent. However it is preferred to avoid the loss of sulphide-oxidising bacteria in such a step and ensure that the majority of these bacteria are provided to step (d).

A source of the regenerated sulphide-oxidizing bacteria as present in step (b) is the loaded aqueous solution obtained in step (a). Suitably step (b) is performed with an additional amount of regenerated sulphide-oxidizing bacteria which are directly obtained from step (d) and which are thus not part of the loaded aqueous solution. In such an embodiment part of the second liquid effluent is suitably used as the aqueous solution in step (a) and part of the second liquid effluent is suitably, in admixture with the loaded aqueous solution, contacted with the mercaptan reducing microorganisms in step (b). By such direct recycle of the second liquid effluent the concentration of regenerated bacteria in step (b) can be maintained at a higher level which may result in a lower bisulphide concentration in step (b) which is advantageous as explained above. Moreover, such direct recycle will result in an increased pH in step (b). This is especially advantageous when the gas to be treated in step (a) is a so-called sour gas, for example a gas comprising carbon dioxide. The loaded aqueous solution having such a lower pH will then be mixed with directly recycled second liquid effluent of step (d) having a higher pH resulting in a more favorable pH at which step (b) is performed. Optionally, the second liquid effluent is subjected to degassing before recycling such stream as described above.

This recycle of part of the second liquid effluent which by-passes step (a) may be performed in various manners as for example illustrated In the Figures. This part of the second liquid effluent may be first mixed with the loaded aqueous solution in a separate mixing zone before performing step (b). In such a mixing zone degassing may also be performed if so required. This mixing zone may also be a special compartment as in the lower end of an absorption column in which step (a) is performed. The second liquid effluent which by-passes step (a) may also be directly supplied to the vessel in which step (b) is performed.

In step (c) the aqueous solution obtained in step (b) is separated from the mercaptan reducing microorganisms to obtain a first liquid effluent. Such a separation may be achieved in various manners. Although a full separation is preferred a skilled person will understand that some mercaptan reducing bacteria may remain in the first liquid effluent. Suitably separation is achieved by biomass retention wherein the biomass is the mercaptan reducing microorganisms which are retained in a vessel while the first liquid effluent is discharged from the vessel. This vessel may be the vessel in which step (b) is performed or may be a separate vessel. Biomass retention may be achieved by performing step (b) in a continuous or semi-batch type of reactor. An example of such a reactor is an up-flow anaerobe sludge blanket digestion reactor also referred to as an UASB reactor. The mercaptan reducing microorganisms will suitably have a higher density than the aqueous solution in step (b) and/or (c) in order to retain the organisms in the reactor or vessel. This can be achieved by choosing the conditions such that the microorganism are present as flakes. More suitably biomass retention may be achieved by using mercaptan reducing microorganisms immobilized on a fluidized carrier wherein the microorganisms on the carrier have a higher density than the aqueous solution. Examples of suitable fluidized carriers are particles, comprised of for example glass, sand, pumice, porous calcium silicate hydrate, carbon, ion exchangers, open celled or foamed polymers and zeolites. Fluidized particles may be separated from the first liquid effluent by making use of the difference in density, for example by gravity as in a UASB or centrifugal forces. Alternatively separation may be achieved by making use of the different size of the carrier and the sulphide oxidising bacteria and elemental sulphur. Such separation may be achieved by filters and the like. Separation zones in which one or more of the afore mentioned methods of separation take place may be present in the vessel or may be performed in one or more separate apparatuses.

The mercaptan reducing microorganisms may also be immobilized on a carrier which is fixed within a vessel in which step (b) takes place. Separation of step (c) is effected by simply discharging the first liquid effluent from the vessel. The mercaptans reducing microorganism may be supported on the surface of such a carrier material as a biofilm. This surface may be the outer surface and/or the surface area of any optional pores present in the carrier. A fixed carrier is any carrier which is fixed to the vessel, reactor or any other process equipment in which step (b) is performed. Examples of suitable fixed carrier are mineral fibers, packed bed of spheres, structures like sieve plates. By fixed carrier is not meant the interior walls of these vessels, reactor or any other process equipment. By fixed carrier is here meant any on-purpose structure which enables additional surface area in addition to these interior walls. The ratio of this surface area of the carrier and the volume of aqueous solution in step (b) is suitably at least 2 and preferably at least 10 $m^2/m^3$, more preferably at least 100 $m^2/m^3$.

In step (d) the first liquid effluent is contacted with an oxidant to regenerate the sulphide-oxidising bacteria to obtain a second liquid effluent comprising regenerated sulphide-oxidising bacteria. The oxidant may be for example nitrate or molecular oxygen and preferably molecular oxygen. The oxidant may be supplied to this aqueous solution in any suitable way, preferably by supplying a gaseous stream comprising molecular oxygen to the aqueous solution. The gaseous stream comprising molecular oxygen may be any suitable gas comprising oxygen, preferably air. Preferably, the amount of oxidant supplied is at least about the stoichiometric amount needed for oxidation of the sulphide as absorbed in step (a) and subsequently converted to elemental sulphur. Because the content of bisulphide in the first liquid effluent is very low in step (d) the amount of oxidant supplied to step (d) is less critical as compared to the prior art processes. Even if an amount of oxidant is above the above referred to stoichiometric amount the formation of large amounts of undesired sulphur compounds such as sulphate and thiosulphate is not to be expected due to the very low content of bisulphide.

An advantage of using a gaseous stream comprising molecular oxygen in step (d) is that it will strip any carbon dioxide as present in the aqueous solution. This is advantageous because as a result the pH of the aqueous solution will increase making the aqueous solution more suited for reuse in step (a).

The regeneration of the sulphide-oxidising bacteria in step (d) may take place at any conditions of temperature, pressure and hydraulic residence time known to be suitable for biological oxidation of bisulphide into elemental sulphur of the prior art aerobic or quasi-aerobic processes. Preferably the temperature is in the range of from 10 to 60° C., more preferably of from 20 to 40° C. The pressure is preferably in the range 0 bara to 10 bara, more preferably of from atmospheric pressure to 5 bara, even more preferably at atmospheric pressure.

The elemental sulphur as formed in step (b) and optionally in step (a) is suitably isolated from the aqueous solution in step (d). This isolation of elemental sulphur may be performed by any means known in the art, such as for example by means of sedimentation or other means for solid-liquid separation. Preferably elemental sulphur is recovered by taking part of the aqueous solution which has contacted the oxidant in step (d) and isolating elemental sulphur from that part to obtain a sulphur-depleted effluent. Another part of this aqueous solution may be recovered as the second liquid effluent and recycled to step (a) and suitably also to step (b). Part of the sulphur depleted effluent may be recycled to the vessel in which the contacting between oxidant and first liquid effluent takes place and part of the sulphur depleted effluent may be purged.

Although the formation of undesired higher oxidised sulphur compounds such as sulphate and thiosulphate are importantly reduced compared to prior art biological sulphide oxidation processes, some higher oxidised sulphur compounds may still be formed, in particular in step (d). In order to avoid undesired built-up of higher oxidised sulphur compounds in the process, part of the second liquid effluent or part of the sulphur-depleted effluent is purged, for example as described above. Such a purge stream, also referred to as a bleed stream, will preferably be subjected to a membrane separation step in order to separate regenerated sulphide oxidising bacteria from the bleed stream. In the membrane separation a retentate stream comprising sulphide-oxidising bacteria and a permeate stream that is essentially free of sulphide-oxidising bacteria is obtained. The retentate stream is recycled to the process and the permeate stream is purged from the process. In the membrane separation step, any suitable membrane may be used. Preferably, ultra-filtration membranes are used. Because in the process according to the invention the formation of higher oxidised sulphur compounds is very much reduced the purge may be relatively small. Applicants found the above described membrane separation may even be omitted. This because the loss of sulphide-oxidising bacteria via the purge is compensated by the growth of the bacteria population in the process.

Step (b) and (d) are performed in at least two separate reaction zones in order to achieve the anaerobic and aerobic conditions of the separate steps. These zones may be combined in one reactor vessel. Preferably these zones are performed in different vessels, for example different bioreactors. Suitably bioreactors are used which allow a sufficient back-mixing. More preferably the bioreactor has the configuration of a Continuously Stirred Tank Reactor (CSTR). Step (b) may be performed in an up-flow anaerobe sludge blanket digestion (UASB) reactor as described above.

If step (a) is operated at an elevated pressure it may be desirable to operate the bioreactors at a more atmospheric pressure. Suitably the loaded aqueous solution is first subjected to a flash vessel, suitably provided with a recontactor to which the second aqueous effluent is provided which by-passes step (a) such to reduce bisulphide losses. The effluent of the flash vessel may be provided to step (b) as the loaded aqueous solution, optionally in admixture with the second liquid effluent. Step (b) itself may also be performed in the flash vessel. The residence time of such a flash vessel should then be large enough to ensure enough residence time to perform step (b). In order to avoid losses of bisulphide in the flashed gas a recontactor is suitably used. In this recontactor the flashed gas may be contacted with the second liquid effluent which by-passes step (a).

Steps (b), (c) and (d) may also be performed without performing step (a) on any aqueous solution comprising bisulphide and mercaptans as described above. Such streams are for example the liquor of mercaptan-rich caustic solutions as obtained in processes where caustic is used to remove mercaptans and hydrogen-sulphide from hydrocarbon comprising streams. Thus the invention is also directed to a process to treat a hydrogen sulphide and mercaptans comprising aqueous solution comprising the following steps:

(bb) contacting the aqueous solution with a mercaptan reducing microorganism and with a bisulphide oxidising bacteria under anaerobic conditions wherein bisulphide is converted to elemental sulphur and mercaptans are converted to hydrocarbons and hydrogen sulphide, (cc) separating the aqueous solution obtained in step (bb) from the mercaptan reducing microorganisms to obtain a first liquid effluent, (dd) contacting the first liquid effluent with an oxidant to regenerate the sulphide-oxidising bacteria to obtain a second liquid effluent comprising regenerated sulphide-oxidising bacteria, wherein the sulphide-oxidising bacteria as present in step (bb) are comprised of regenerated sulphide-oxidising bacteria obtained in step (dd).

Steps (bb), (cc) and (dd) are preferably performed as described for steps (b), (c) and (d) respectively.

The invention is also directed to a method to optimize an existing aerobic process comprising X1 an absorption column comprising a feed inlet for sour gas at its lower end and a liquid feed inlet for a liquid comprising sulphide-oxidising bacteria at its upper end X2 an aerobic bio-reactor comprising sulphide-oxidising bacteria, X3 a sulphur separation step, X4 a sulphide-oxidising bacteria recycle from X2 to X1, wherein an anaerobic reactor X5 comprising a carrier is added as part of X4 and performing the process according to the present invention. Preferably a source of mercaptans reducing microorganisms is added to the process, for example when no such bacteria start to grow on the carrier in the added anaerobic reactor X5. The anaerobic reactor X5 may also be added as a separate reactor vessel or alternatively be created at the lower end of the absorption column X1. This may be achieved by repositioning the gas inlet of the sour gas in the absorption column X1 to a more elevated height and adding a second inlet for a liquid feed comprising sulphide-oxidising bacteria to a less elevated height with respect to the existing inlet. This creates an anaerobic reactor X5 in the lower part of the column.

DETAILED DESCRIPTION OF THE DRAWINGS

In the process shown in FIG. 1, a gas stream comprising hydrogen sulphide is supplied via line 1 to absorption column 2. Liquid alkaline sorbent comprising regenerated sulphide oxidizing bacteria is supplied to the upper part of column 2 via line 3 such that the sour gas is contacted with the alkaline sorbent to obtain a treated gas stream and a loaded aqueous solution. The treated gas stream is withdrawn from the column via line 4. The loaded aqueous solution is withdrawn from the bottom of column 2 via line 5 and supplied to a first bioreactor 6. First bioreactor 6 is provided with a carrier on which mercaptans reducing organisms are immobilized. In first bioreactor 6, bisulphide is converted into elemental sulphur by the sulphide-oxidising bacteria and mercaptans are reduced by the immobilized mercaptans reducing microorganisms under anaerobic conditions. During the start-up phase of the process, sulphide-oxidising bacteria and/or mercaptan reducing organisms may be supplied to first bioreactor 6 or elsewhere in the process. First liquid effluent obtained in first bioreactor 6 is discharged via line 7 to a second bioreactor 8 for regeneration of the sulphide-oxidising bacteria. Air is supplied as oxidant to bioreactor 8 via line 9. A gaseous stream comprising excess air and components stripped from the reactor liquid is withdrawn via line 10. Part of the contents of second bioreactor 8 is withdrawn from the reactor and supplied to separator 15 wherein precipitated solid elemental sulphur, as discharged via line 17, is separated from the solution to obtain a sulphur-depleted effluent. The sulphur-depleted effluent is partly recycled to second bioreactor 8 via line 16 and partly discharged from the process via bleed stream 18. Part of the contents of second bioreactor 8, as the second liquid effluent, is provided via line 12 and line 3 to the upper part of absorption column 2 to provide the above referred liquid alkaline sorbent. With this sorbent recycle, also regenerated bacteria are recycled to absorption column 2 and indirectly to first bioreactor 6. Part of the contents of second bioreactor 8 is provided via line 12 and 13 directly to first bioreactor 6 as the second liquid effluent.

The invention is also directed to a sulphur reclaiming process facility of FIG. 1 comprising:

an absorption column provided with an inlet for a sour gas, outlet for treated gas, an inlet for an alkaline liquid absorbent at its upper end and an outlet for a loaded aqueous solution, a first anaerobic operated bioreactor having an inlet fluidly connected to the outlet for a loaded aqueous solution and an outlet for a first liquid effluent further provided with a carrier for an immobilized mercaptan reducing microorganism, a second aerobic operated bioreactor provided with an inlet fluidly connected to the outlet for a first liquid effluent and an outlet for a second liquid effluent, an elemental sulphur recovery unit provided with an inlet fluidly connected to the outlet for a first liquid effluent or connected to the outlet for a second liquid effluent and outlet for elemental sulphur and an outlet for a liquid effluent poor in elemental sulphur, wherein the inlet for an alkaline liquid absorbent are directly or indirectly connected to the outlet for a second liquid effluent.

Figure 2:
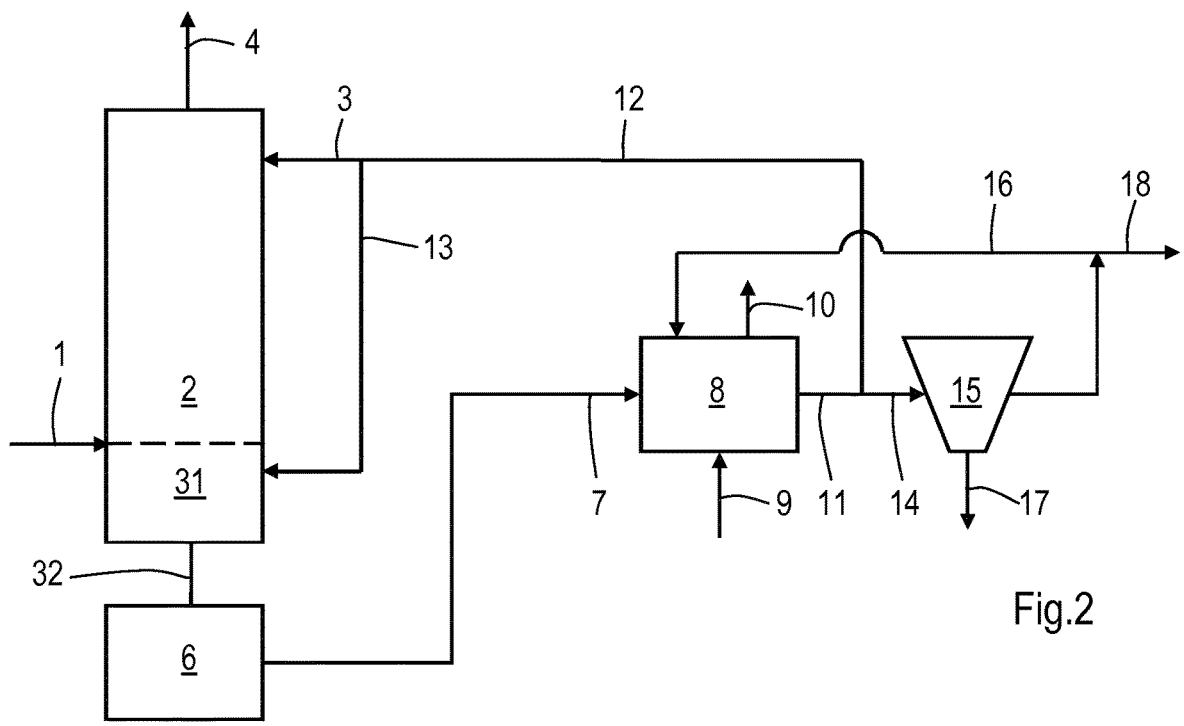
FIG. 2 shows an alternative line-up of the line-up of FIG. 1.

FIG. 2 is as similar process line-up as shown in FIG. 1 except in that the second liquid effluent which by-passes step (a) is fed via line 13 to a lower part of absorption column 2 where this stream 13 is mixed with the loaded aqueous solution which flows downward from the absorption stages of the column via line 31 in a mixing zone 31. The resulting mixture is subsequently fed to first bioreactor 6 to perform step (b). The remaining numbers have the same meaning as in FIG. 1.

Figure 3:
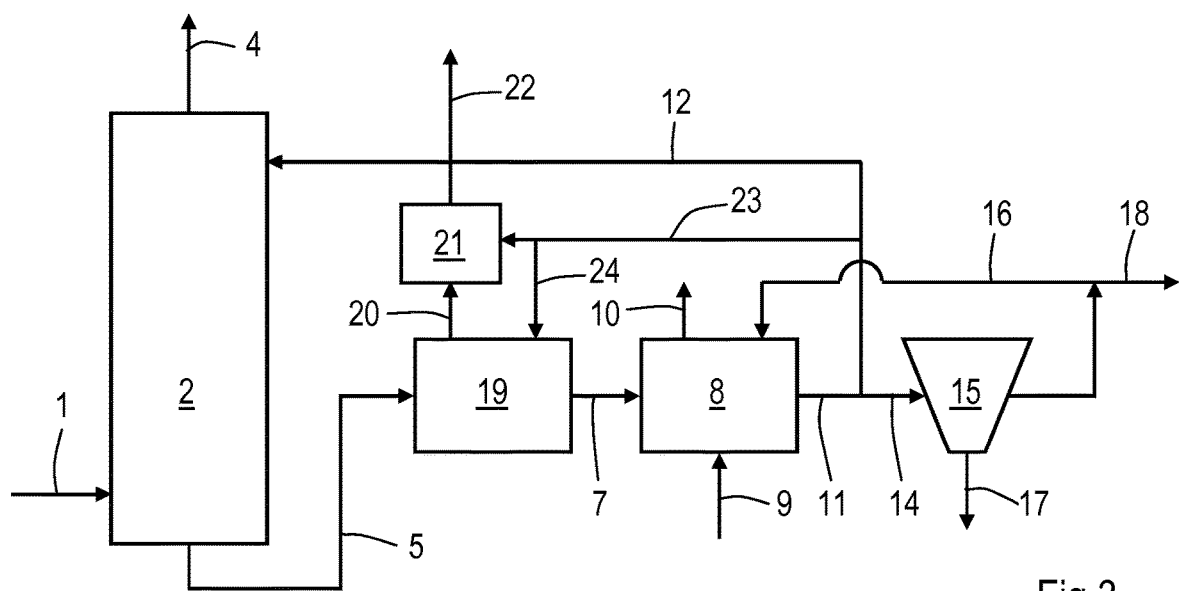
FIG. 3 shows a process line-up as in FIG. 1 wherein the first bioreactor is a flash vessel.

In FIG. 3a process line-up is shown of an embodiment of the invention wherein step (b) is performed in first bioreactor which is a flash vessel 19 provided with a recontactor 21. Corresponding reference numbers have the same meaning as in FIG. 1. In such a line-up absorption column 2 is operated at an elevated pressure in order to treat a gas stream 1 having an elevated pressure. In flash vessel 19 the pressure drops and a flash gas 20 is thereby generated. The flash gas 20 may comprise bisulphide as hydrogen sulphide and mercaptans, and in order to capture these compounds the gas 20 is contacted with part of the second liquid effluent 23 in recontactor 21. The thus washed gas is discharged as gas stream 22. In flash vessel 19 step (b) of the invention takes place. The resulting first liquid effluent 7 is provided to second bioreactor 8 to perform step (d). FIG. 3 also shows that part of the second liquid effluent 24 may be directly supplied to the flash vessel 19.

Figure 4:
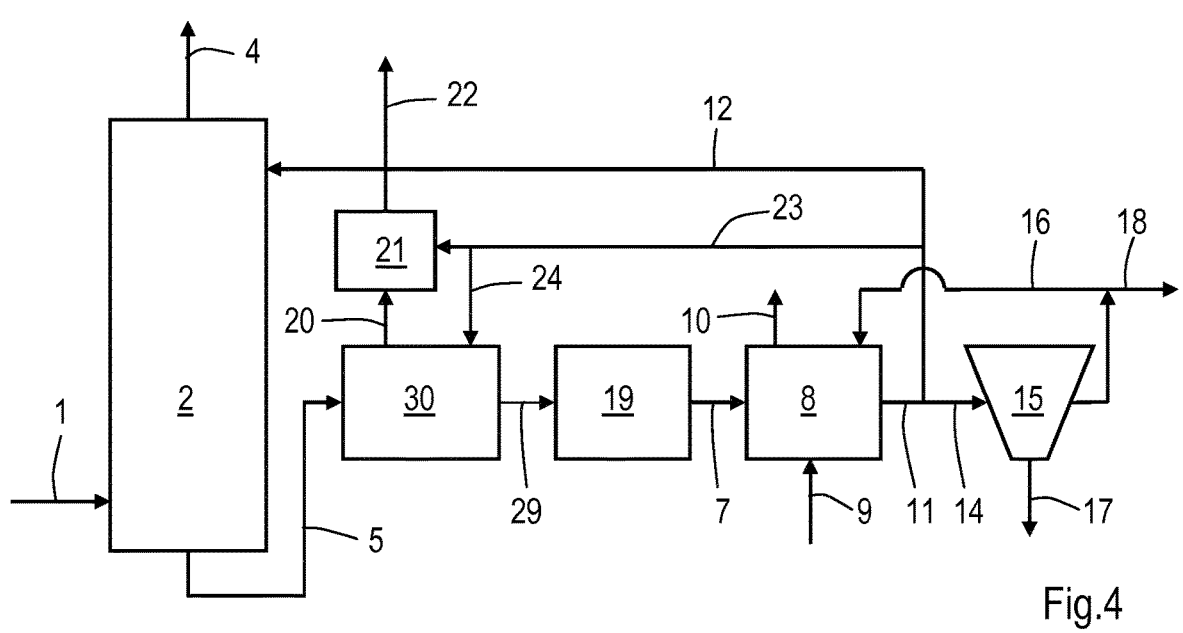
FIG. 4 shows an alternative line-up of the line-up of FIG. 3.

In FIG. 4a line-up is shown comparable to the line-up of FIG. 3 except in that the loaded aqueous solution is first provided via 5 to a flash vessel 30 in which the loaded aqueous solution is mixed with the second liquid effluent as provided via 23 and 24 and wherein the mixture is provided via 29 to a separate bioreactor 19 in which step (b) takes place. The remaining numbers have the same meaning as in FIG. 1.

Figure 5:
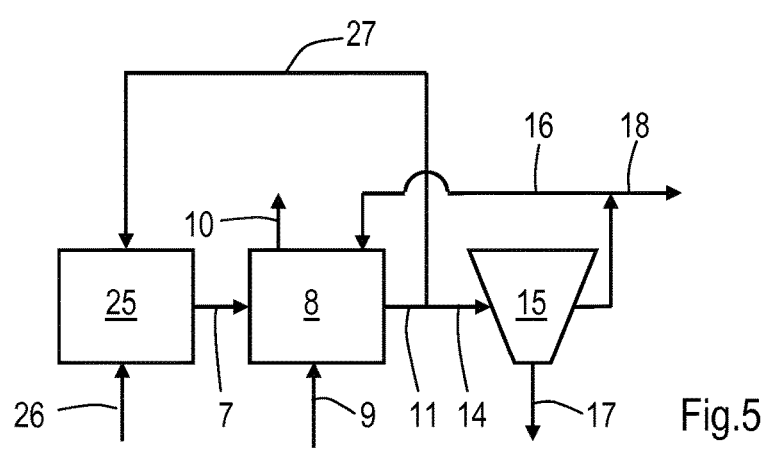
FIG. 5 shows a process line-up wherein a hydrogen sulphide and mercaptan comprising gas stream is directly fed to a first bioreactor.

FIG. 5 shows a process line-up wherein of an embodiment of the invention wherein to the first bioreactor 25a stream 26 of substantially pure hydrogen sulphide and mercaptans comprising gas is directly fed. In bioreactor 25 step (b) is performed resulting in a first liquid effluent 7. This first liquid effluent is processed as described for FIG. 1. Part of the second effluent 11 is recycled via 27 to first bioreactor 25. Corresponding reference numbers have the same meaning as in FIG. 1.

The invention claimed is:

1. A process to treat a hydrogen sulphide and mercaptans comprising gas comprising the following steps:

(a) contacting the hydrogen sulphide and mercaptans comprising gas with an aqueous solution comprising sulphide-oxidising bacteria thereby obtaining a loaded aqueous solution comprising bisulphide and mercaptan compounds and sulphide-oxidising bacteria and a gas having a lower content of hydrogen sulphide and mercaptans, (b) contacting the loaded aqueous solution with a mercaptan reducing microorganism under anaerobic conditions wherein bisulphide is converted to elemental sulphur and mercaptans are converted to hydrocarbons and hydrogen sulphide, (c) separating the loaded aqueous solution obtained in step (b) from the mercaptan reducing microorganisms to obtain a first liquid effluent, (d) contacting the first liquid effluent with an oxidant to regenerate the sulphide-oxidising bacteria to obtain a second liquid effluent comprising regenerated sulphide-oxidising bacteria, wherein the sulphide-oxidising bacteria as present in step (a) are comprised of regenerated sulphide-oxidising bacteria obtained in step (d).

2. The process according to claim 1, wherein part of the second liquid effluent is used as the aqueous solution in step (a) and part of the second liquid effluent is, in admixture with the loaded aqueous solution, contacted with the mercaptan reducing microorganisms in step (b).

3. The process according to claim 1, wherein elemental sulphur is isolated from the second liquid effluent.

4. The process according to claim 1, wherein the anaerobic conditions of step (b) comprise a concentration of molecular oxygen in the loaded aqueous solution of no more than 1 μM.

5. The process according to claim 1, wherein more than 80 mol % of the bisulphide is converted by the sulphide-oxidising bacteria in step (b).

6. The process according to claim 1, wherein the loaded aqueous solution as obtained in step (a) comprises dissolved bisulphide and sulphur converted to elemental sulphur by the sulphide-oxidising bacteria in step (a) having a combined concentration in the range of from 100 mg/L to 15 g/L expressed as sulphur.

7. The process according to claim 1, wherein the loaded aqueous solution as obtained in step (a) comprises mercaptans having a concentration of at most 5 g/L.

8. The process according to claim 1, wherein the first liquid effluent as supplied to step (d) comprises less than 5 mM dissolved bisulphide.

9. The process according to claim 1, wherein step (b) and step (c) are performed in an up-flow anaerobe sludge blanket digestion (UASB) reactor.

10. The process according to claim 1, wherein the mercaptan reducing microorganisms are immobilized on a carrier.

11. The process according to claim 10, wherein the ratio of surface area of the carrier and the loaded aqueous solution's volume as present in step (b) is at least 10 m$^2$/m$^3$.

12. The process according to claim 1, wherein the aqueous solution comprising sulphide-oxidising bacteria aqueous solution used in step (a) is a buffered solution further comprising sodium carbonate and sodium bicarbonate or potassium carbonate and potassium bicarbonate or their mixtures.

13. The process according to claim 1, wherein the oxidant in step (d) is molecular oxygen.

14. The process according to claim 1, wherein the process is a continuous process.

15. The process according to claim 1, wherein in step (b) additional electron-donors is added to enhance the reduction of the mercaptans by the mercaptan reducing microorganisms.

16. The process according to claim 15, wherein the additional electron-donor is hydrogen.

* * * * *